(12) United States Patent
Pushkarev et al.

(10) Patent No.: US 12,285,897 B2
(45) Date of Patent: Apr. 29, 2025

(54) OVER MANDREL EXTRUSION FOR COMPOSITE PCP STATOR

(71) Applicant: Schlumberger Technology Corporation, Sugar Land, TX (US)

(72) Inventors: Maxim Pushkarev, Lawrence, KS (US); Pete Hondred, De Soto, KS (US); Jason Holzmueller, Lawrence, KS (US); William Goertzen, Lawrence, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 90 days.

(21) Appl. No.: 18/002,508

(22) PCT Filed: Jun. 30, 2021

(86) PCT No.: PCT/US2021/039840
§ 371 (c)(1),
(2) Date: Dec. 20, 2022

(87) PCT Pub. No.: WO2022/006240
PCT Pub. Date: Jan. 6, 2022

(65) Prior Publication Data
US 2023/0234274 A1    Jul. 27, 2023

Related U.S. Application Data

(60) Provisional application No. 63/046,254, filed on Jun. 30, 2020.

(51) Int. Cl.
B29C 48/30    (2019.01)
B29C 48/00    (2019.01)
(Continued)

(52) U.S. Cl.
CPC .......... B29C 48/301 (2019.02); B29C 48/022 (2019.02); B29C 48/09 (2019.02);
(Continued)

(58) Field of Classification Search
CPC .................................................... B29C 48/301
See application file for complete search history.

(56) References Cited

U.S. PATENT DOCUMENTS 1,824,482 A * 9/1931 Hartmann ................ B28B 3/26
425/319
2,740,987 A * 4/1956 Moncrieff ............... B29C 53/12
264/281

(Continued)

FOREIGN PATENT DOCUMENTS

CN    2411362    12/2000
CN    106762610 A    5/2017
(Continued)

OTHER PUBLICATIONS

Screw, Thread at https://en.wikipedia.org/wiki/Screw_thread#Lead,_pitch,_and_starts, Downloaded on Dec. 4, 2022 (17 pages).
(Continued)

*Primary Examiner* — Timothy Kennedy
(74) *Attorney, Agent, or Firm* — Jeffrey D. Frantz

(57) ABSTRACT

Techniques for forming a helical rubber hose are provided. Such techniques include modified crosshead extrusion techniques in which an elastomer is melted, fed into a crosshead assembly, and extruded on a helical mandrel fed through the crosshead assembly to form a hose. In techniques described herein, relative axial and rotational motion of the mandrel and a die plate at or on the outlet or output of the crosshead assembly are kinematically matched such that the distance of relative axial movement of the mandrel per one revolution equals one pitch of the mandrel.

11 Claims, 7 Drawing Sheets

Option B

(51) Int. Cl.
  *B29C 48/09* (2019.01)
  *B29C 48/12* (2019.01)
  *B29C 48/34* (2019.01)
  *B29D 23/00* (2006.01)
  *B29D 23/18* (2006.01)
  B29K 21/00 (2006.01)
  B29K 101/10 (2006.01)
  B29L 23/00 (2006.01)

(52) U.S. Cl.
  CPC .............. *B29C 48/12* (2019.02); *B29C 48/34* (2019.02); *B29D 23/001* (2013.01); *B29D 23/18* (2013.01); *B29K 2021/00* (2013.01); *B29K 2101/10* (2013.01); *B29L 2023/005* (2013.01)

(56) References Cited

U.S. PATENT DOCUMENTS

| | | | |
|---|---|---|---|
| 4,548,567 A | 10/1985 | Missout | |
| 4,806,086 A | 2/1989 | Bloch | |
| 5,156,796 A * | 10/1992 | Nakagawa | B29C 48/21 264/514 |
| 5,171,138 A | 12/1992 | Forrest | |
| 5,273,421 A * | 12/1993 | Kanoh | B29C 48/12 425/467 |
| 5,759,019 A | 6/1998 | Wood | |
| 6,162,032 A | 12/2000 | Jager | |
| 6,197,239 B1 * | 3/2001 | Kirjavainen | F16L 9/21 264/108 |
| 6,336,796 B1 | 1/2002 | Cholet | |
| 6,604,921 B1 | 8/2003 | Plop | |
| 6,604,922 B1 | 8/2003 | Hache | |
| 7,083,401 B2 | 8/2006 | Hooper | |
| 7,517,202 B2 | 4/2009 | Delpassand | |
| 7,739,792 B2 | 6/2010 | Lee | |
| 7,896,628 B2 | 3/2011 | Sindt | |
| 2001/0005486 A1 | 6/2001 | Wood | |
| 2005/0089429 A1 | 4/2005 | Delpassand | |
| 2005/0260407 A1 | 11/2005 | Anand | |
| 2006/0131079 A1 | 6/2006 | Bottos | |
| 2006/0153724 A1 | 7/2006 | Delpassand | |
| 2007/0295510 A1 | 12/2007 | Liu | |
| 2008/0023863 A1 | 1/2008 | Lee | |
| 2009/0169364 A1 | 7/2009 | Downton | |
| 2010/0086425 A1 * | 4/2010 | Steele | F04C 2/1073 418/48 |
| 2011/0116960 A1 | 5/2011 | Akbari et al. | |
| 2011/0203110 A1 | 8/2011 | Hooper | |
| 2011/0271527 A1 | 11/2011 | Lee | |
| 2013/0052067 A1 | 2/2013 | Hohl | |
| 2013/0118247 A1 | 5/2013 | Akbari | |
| 2015/0017047 A1 * | 1/2015 | Akbari | B29C 70/745 418/152 |
| 2015/0110643 A1 | 4/2015 | Liu | |
| 2015/0122549 A1 | 5/2015 | Hohl | |
| 2015/0184498 A1 | 7/2015 | Twidale | |
| 2015/0354706 A1 | 12/2015 | Yamanaka | |
| 2016/0186747 A1 | 6/2016 | Ramier | |
| 2021/0288541 A1 | 9/2021 | Madbouly | |

FOREIGN PATENT DOCUMENTS

| | | | |
|---|---|---|---|
| JP | 2009096062 A | 5/2009 | |
| RU | 2611125 C2 | 2/2017 | |
| WO | 9701428 A1 | 1/1997 | |
| WO | 0144615 A2 | 6/2001 | |
| WO | 0181730 A1 | 11/2001 | |
| WO | 2004113727 A2 | 12/2004 | |
| WO | 2016089938 A1 | 6/2016 | |
| WO | 2018156411 A1 | 8/2018 | |
| WO | 2022040522 A1 | 2/2022 | |

OTHER PUBLICATIONS

International Search Report and Written Opinion issued in PCT Application PCT/US2021/039840, dated Oct. 27, 2021 (10 pages).
International Search Report and Written Opinion issued in PCT Application PCT/US2021/046899, dated Dec. 1, 2021 (11 pages).
Progressing cavity pump, downloaded on Jan. 20, 2023 from link https://en.wikipedia.org/wiki/Progressive_cavity_pump (4 pages).
Downhole PC pumps, downloaded on Jan. 20, 2023 from link https://petrowiki.spe.org/Downhole_PC_pumps (9 pages).
Progressing cavity pump (PCP) systems, downloaded on Jan. 20, 2023 from link https://petrowiki.spe.org/Progressing_cavity_pump_(PCP)_systems.
International Search Report and Written Opinion issued in the PCT Application No. PCT/US2023/084755 dated Apr. 24, 2024, 12 pages.
International Search Report and Written Opinion issued in the PCT Application No. PCT/US2023/034876 dated Feb. 14, 2024, 13 pages.
International Search Report and Written Opinion issued in the PCT Application No. PCT/US2023/085287 dated Apr. 26, 2024, 11 pages.
Extended Search Report issued in European Patent Application No. 21834228.5 dated Jun. 28, 2024, 8 pages.
Notice of Allowance issued in the U.S. Appl. No. 18/041,414 dated Aug. 5, 2024, 5 pages.

* cited by examiner

Option A

Option B

OVER MANDREL EXTRUSION FOR COMPOSITE PCP STATOR

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a National Stage Entry of International Appplication No. PCT/US2021/039840, filed Jun. 30, 2021, which claims priority benefit of U.S. Provisional Application No. 63/046,254, filed Jun. 30, 2020, the entirety of which is incorporated by reference herein and should be considered part of this specification.

BACKGROUND

Field

The present disclosure generally relates to stators and methods of making the same, and more particularly to stators for progressive cavity pumps and methods of making the same.

Description of the Related Art

Oil and gas wells utilize a borehole drilled into the earth and subsequently completed with equipment to facilitate production of desired fluids from a reservoir. Subterranean fluids, such as oil, gas, and water, are often pumped or "lifted" from wellbores by the operation of downhole pumps, for example progressive cavity pumps (PCPs). A PCP includes a single rotor having a helical external surface that rotates inside an internally helicoidally shaped stator having a number of lobes one more than the rotor has. In use, fluid is displaced from the intake at the bottom of the pump to the discharge at the top through a series of cavities that form between the rotor and stator as the rotor rotates within the stator. A motor drives rotation of the rotor. The motor can be located at, the surface of the wellbore, and may be connected to the rotor via one or more sucker rods.

SUMMARY

In some configurations, a method of forming a hose includes: melting a material, such as an elastomer; providing the melted elastomer to a crosshead assembly, wherein a die plate having an outlet port is mounted on an outlet of the crosshead assembly; moving a helical mandrel relative to the crosshead assembly and die plate outlet port while extruding the melted elastomer about the mandrel; and kinematically correlating relative axial and rotational movement between the mandrel and the die plate.

In some configurations, a helical hose is formed by such a method. In some configurations, the helical hose is incorporated into a stator for a progressive cavity pump or a positive displacement motor.

In some configurations, the mandrel is rotationally fixed and the die plate is configured to rotate about a longitudinal axis along which the mandrel extends through the die plate. In some such configurations, kinematically correlating relative axial and rotational movement between the mandrel and the die plate includes axially moving the mandrel a distance equal to one pitch of the mandrel as the die plate rotates one revolution. In some configurations, the die plate is rotationally fixed and the mandrel is configured to rotate about its longitudinal axis. In some such configurations, kinematically correlating relative axial and rotational movement between the mandrel and the die plate includes rotating the mandrel about its longitudinal axis 360° as the mandrel travels axially a distance equal to one pitch of the mandrel. In some configurations, the mandrel is axially and rotationally fixed, and the die plate is configured to move axially and rotate about a longitudinal axis along which the mandrel extends through the die plate. In some configurations, the mandrel is axially fixed, the die plate is rotationally fixed, and the mandrel is configured to rotate about its longitudinal axis as the die plate moves axially. In some configurations, both the mandrel and the die plate are configured to rotate and move axially relative to each other.

The hose material can be an elastomer, such as rubber. Extruding the melted elastomer about the mandrel can include extruding the melted elastomer through a gap between an outer diameter of the mandrel and an inner diameter of the die plate outlet port.

In some configurations, a method for manufacturing a stator for a progressive cavity pump or positive displacement motor includes: forming a helical hose; inserting the helical hose into a stator tube; and filling a gap between an outer diameter of the helical hose and an inner diameter of the stator tube with a material.

The material can be a thermoset resin or plastic. The method can further include curing or vulcanizing the thermoset resin or plastic to solidify and bond the material to the helical hose. The helical hose can be made of rubber. The helical hose can be formed about a mandrel, and the method can further include removing the mandrel from the helical hose.

In some configurations, forming the helical hose includes extruding an elastomer about a mandrel using a crosshead assembly with a die plate while kinematically correlating relative axial and rotational movement between the mandrel and the die plate. Kinematically correlating axial and rotational movement between the mandrel and the die plate can include causing relative axial movement between the mandrel and the die plate a distance equal to one pitch of the mandrel while causing one revolution of relative rotational movement between the mandrel and the die plate.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1:
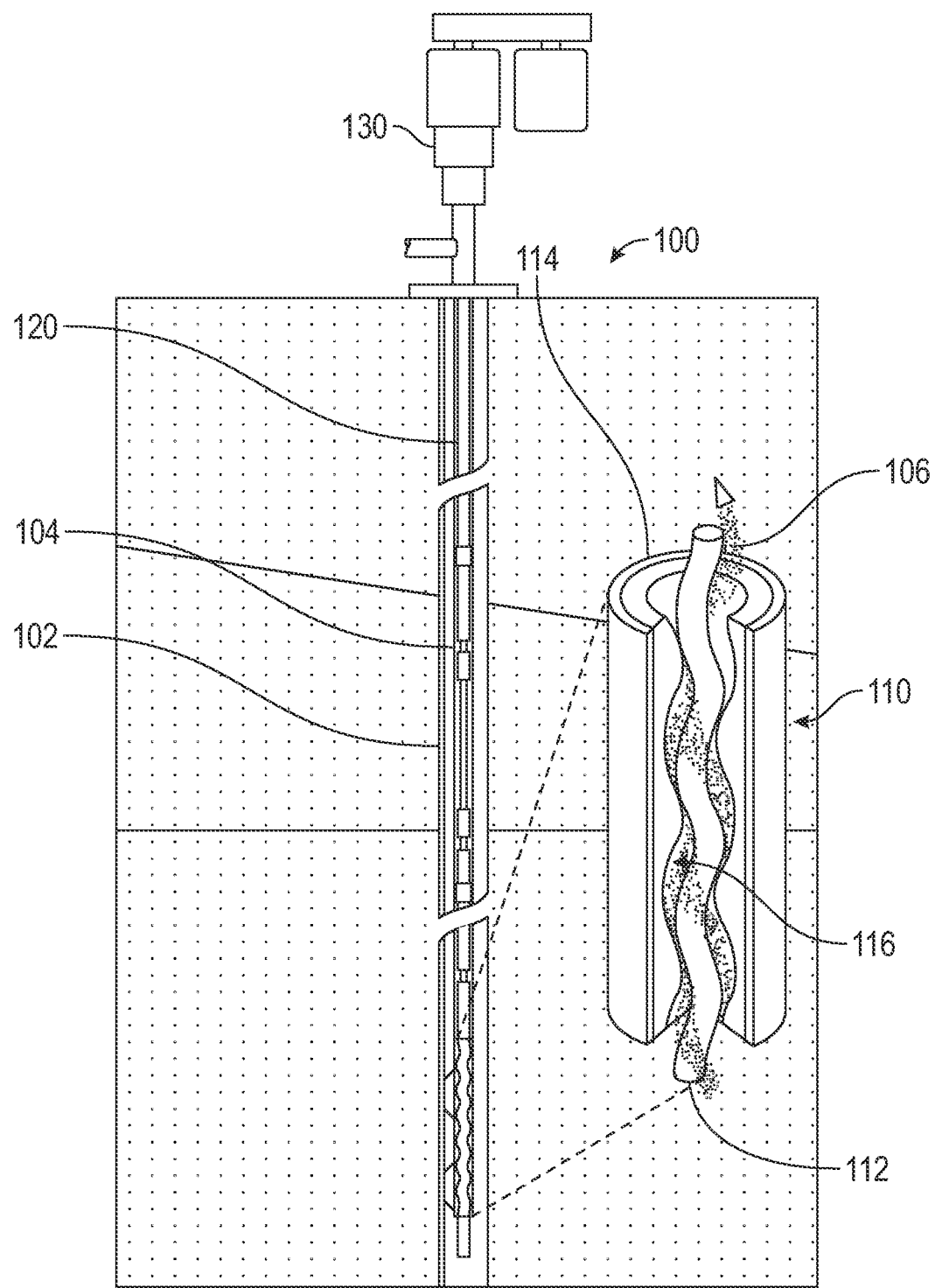
FIG. 1 illustrates an example PCP system.

FIG. 1 illustrates an example PCP system 100. As shown, the PCP system 100 includes a pump (i.e., a PCP) 110, one or more sucker rods 120, and an electric motor 130. The PCP 110 includes a single helical rotor 112 that rotates inside a double helical stator 114 in use. The illustrated configuration includes a 1-lobe rotor and 2-lobe stator. However, other configurations are also possible, such as a 2-lobe rotor with 3-lobe stator or a 3-lobe rotor with a 4-lobe stator. During operation, fluid 106 is transferred from an intake at the bottom of the pump 110 to a discharge or outlet at the top of the pump 110 through a series of cavities 116 that form between the rotor 112 and stator 114 as the rotor 112 rotates within the stator 114.

In use, the PCP 110 is disposed downhole in a borehole lined with a well casing 102. The electric motor 130 is disposed at the surface of the well. The sucker rods 120 extend between and connect (e.g., physically and/or operatively connect) surface components of the system 100, such as the electric motor 130, and downhole components of the system 100, such as the PCP 110. Each sucker rod 120 can be threaded at one or both ends to enable threaded connections with other components, such as the PCP 110 (i.e., the rotor 112), surface component(s), and/or other sucker rods 120. In use, the motor 130 rotates or causes rotation of the sucker rods 120, which in turn rotate or cause rotation of the rotor 112. Production tubing 104 can be disposed in the borehole to convey pumped fluids 106 discharged from the outlet of the PCP 110 to the surface. In the illustrated configuration, the tubing 104 is disposed around or surrounds the sucker rods 120.

Figure 2:
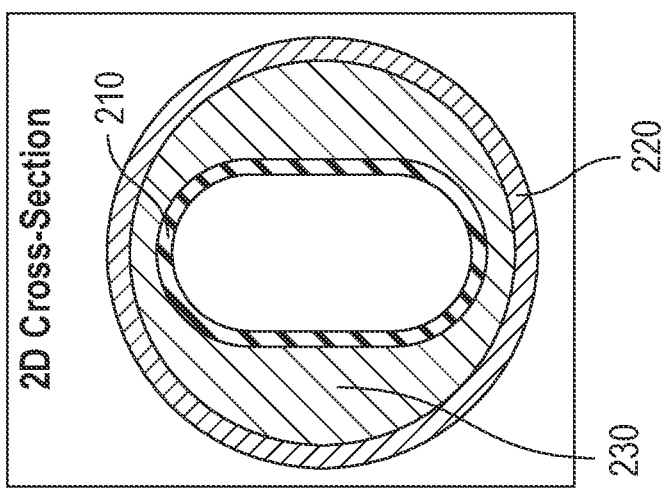
FIG. 2 shows a transverse cross-section of a cPCP stator.

The present disclosure relates to extrusion techniques or technology. In some configurations, the present disclosure relates to manufacturing methods for producing a composite PCP stator, or cPCP stator. FIG. 2 shows a transverse cross-section of an example cPCP stator. As shown, the cPCP stator has an inner lining or layer 210, which may be formed of an elastomer such as a rubber, an outer tube 220, which may be metal, and a middle layer 230, which can be or include thermoset resin or plastic, between (e.g., radially between) the rubber lining 210 and the metal tube 220.

A method or process for manufacturing a cPCP stator can include: fabricating a hose (e.g., an elastomer hose, such as a rubber hose) that will become an inner lining 210 of the stator; placing the rubber hose over, around, or about a mandrel 350, e.g., a metallic mandrel, (or inserting the mandrel 350 in the hollow rubber hose); inserting the mandrel 350 with rubber hose into a metal stator tube; filling a gap between the rubber hose OD (outer diameter) and stator tube ID (inner diameter), for example, with thermoset resin or plastic; and curing (e.g., vulcanizing) the thermoset resin or plastic (or other material used to fill the gap) to solidify and bond the material to the rubber hose.

The present disclosure provides methods for fabricating a helically shaped hose, e.g., an elastomer hose such as a rubber hose, in an accurate and controllable manner. In some configurations, a crosshead extrusion technique allows a material, such as an elastomer or rubber, to be formed into a desired helical shape. The rubber can remain on the mandrel 350 during that process. The technique utilizes an axially movable mandrel 350 and involves kinematically matching rotation between the mandrel 350 OD (outer diameter), which forms the rubber hose 210 ID (inner diameter), and a die plate 360 that forms the rubber hose 210 OD. An axial movement of the mandrel 350 equivalent to a length of one pitch matches a single revolution relative to the die plate 360, which may be a rotatable or non-rotatable feature. In other words, as the mandrel 350 moves axially a distance equivalent to one pitch length, there is one revolution of relative movement between the die plate 360 and the mandrel 350.

Figure 4:
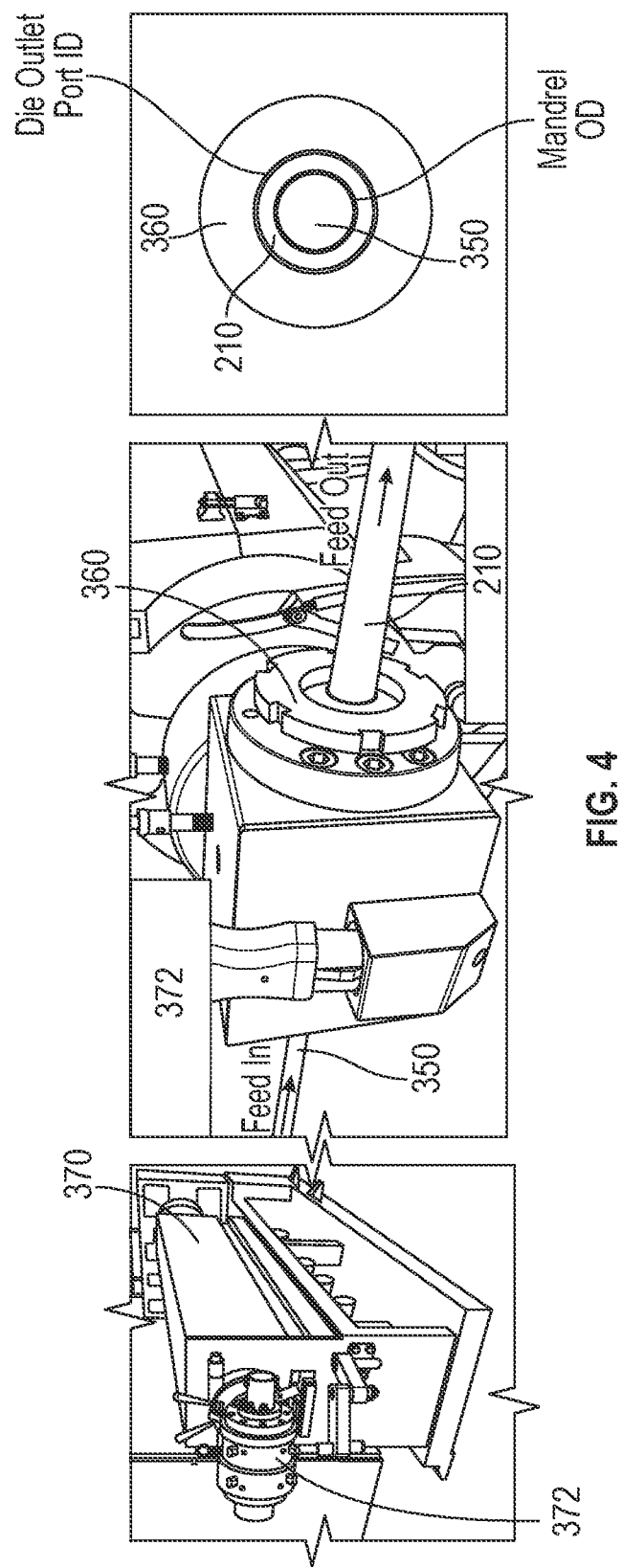
FIG. 4 shows various aspects of a crosshead over mandrel extrusion technique.

Methods according to the present disclosure can be based on or share some features with a traditional crosshead over mandrel extrusion technique, for example as illustrated in FIG. 4. A material such as an elastomer (e.g., a synthetic or natural rubber) is preheated and melted in a high-pressure extrusion machine 370 (or extruder). The rubber melt is fed into a crosshead assembly 372, which may be coupled to or placed adjacent the extruder 370, e.g., coupled to or placed adjacent an outlet of the extruder 370.

Crosshead extrusion processes are often used to make cylindrical rubber rollers. A rigid mandrel (often made of metal) is pushed through the crosshead assembly 372. To form a cylindrical rubber roller, the mandrel is cylindrical. In the crosshead assembly 372, uncured rubber envelops the mandrel OD and is readied for extrusion. The mandrel is moved axially through a hollow die plate mounted on or at the crosshead assembly 372 outlet. Simultaneously, rubber melt is pushed through a gap between the mandrel OD and an ID of an outlet of the die plate. This process forms a uniform rubber layer enveloping the mandrel OD.

Figure 3:
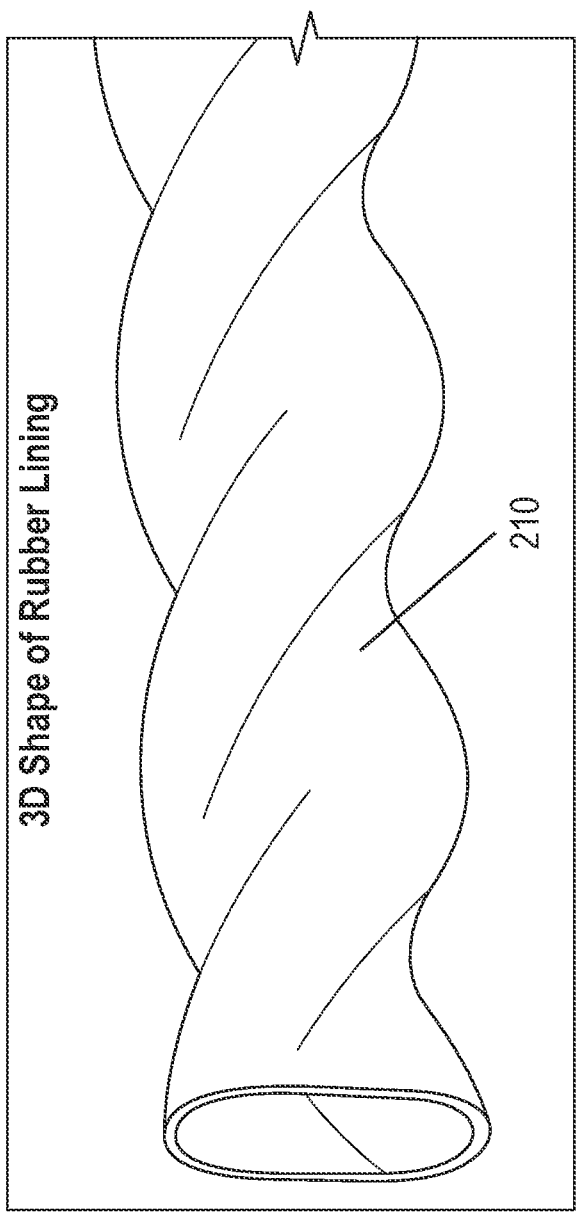
FIG. 3 shows a perspective 3D view of a portion of a rubbing lining of the cPCP stator.
Figure 5A:
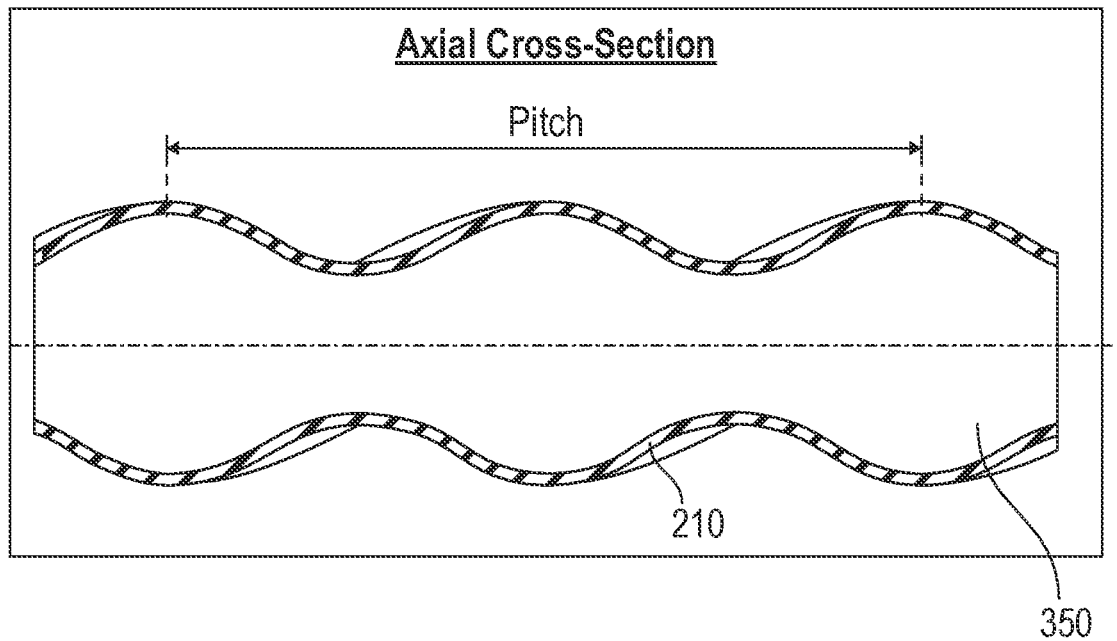
FIG. 5A shows a partial longitudinal cross-section of a helical rubber hose formed on or about a helical mandrel.
Figure 5B:
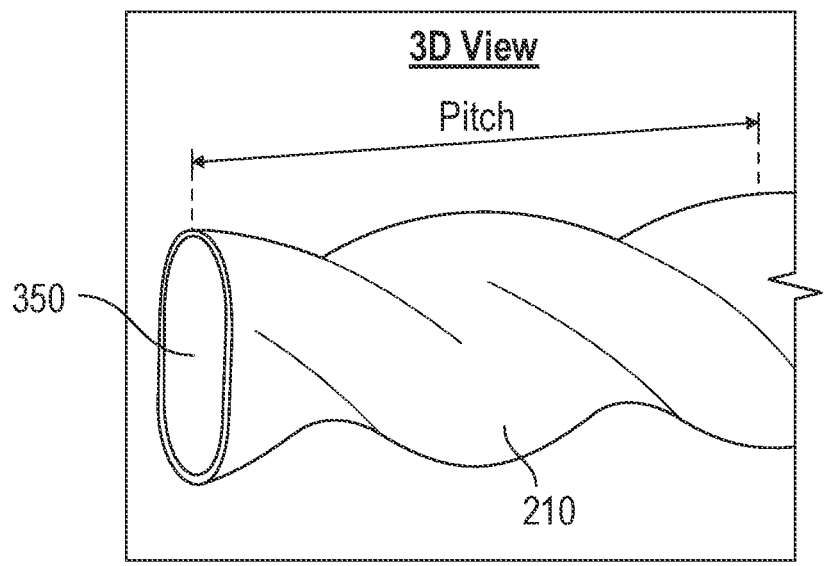
FIG. 5B shows a partial perspective 3D view of the rubber hose and mandrel of FIG. 5A.

According to the present disclosure, this crosshead over mandrel extrusion technique is modified to form a helical rubber hose 210, for example as shown in FIG. 3. In techniques according to the present disclosure, the mandrel 350 is helical, as shown in FIGS. 5A-7. The mandrel 350 can be thought of as or similar to a multi-lead or multi-start screw, in other words, having two or more starts. The example hose of FIG. 3 has two starts. However, more than two starts are also possible. One mandrel pitch (or lead) corresponds to, equals, or approximately or substantially equals one pitch of the helical rubber hose 210 formed by techniques according to the present disclosure, as shown in FIGS. 5A and 5B. In other words, if the mandrel 350 was threaded with an imaginary nut, the pitch could be defined as the axial distance the nut travels along the mandrel 350 with or during one revolution of the nut.

Figure 6:
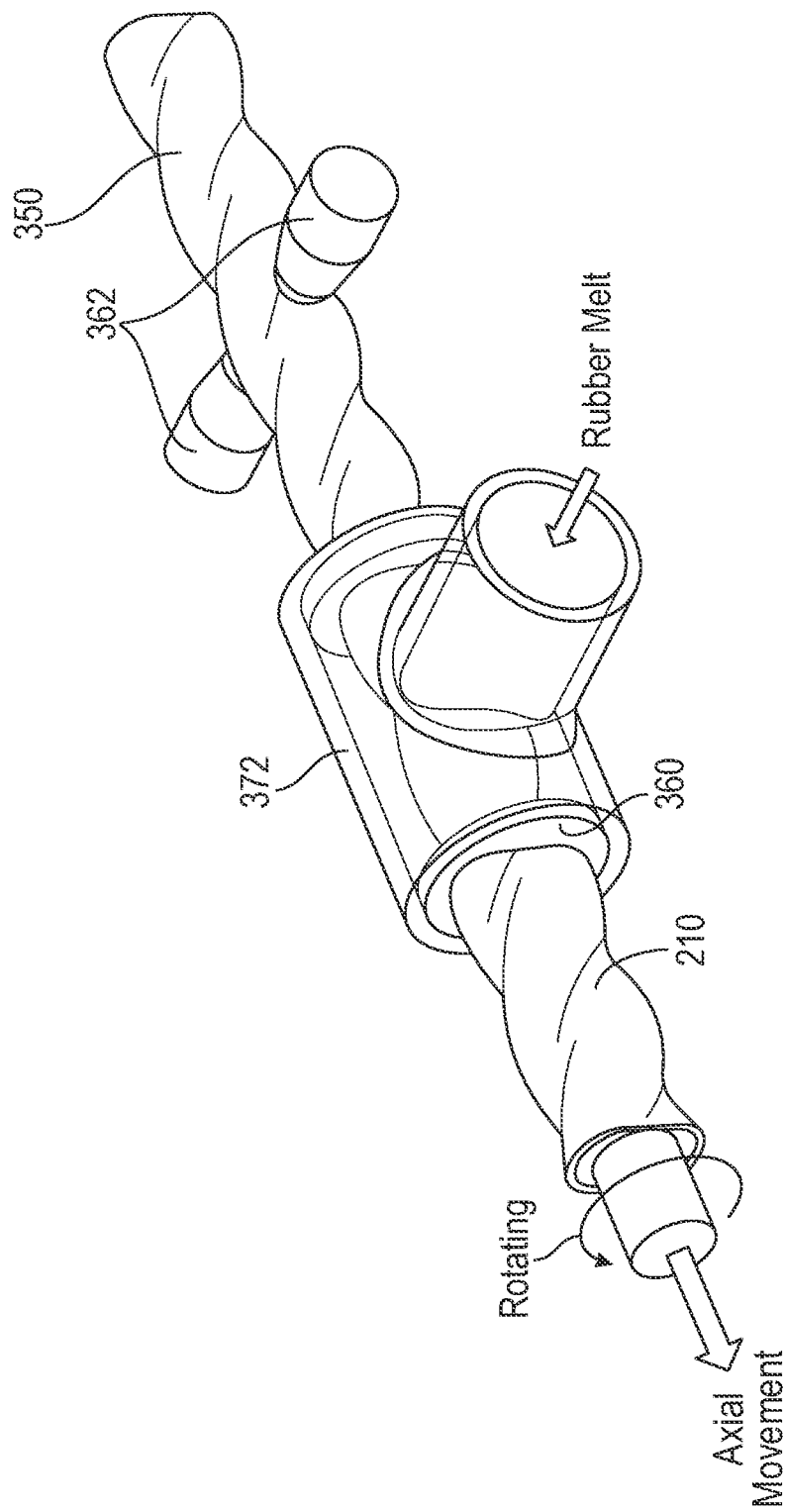
FIG. 6 shows an example technique for forming a helical rubber hose.

Techniques according to the present disclosure introduce a rotational degree of freedom to the mandrel 350 and/or the die plate 360 during the extrusion process. Techniques according to the present disclosure also include a kinematic link between axial movement of the mandrel 350 and relative rotational movement between the mandrel 350 and the die plate 360 (e.g., (1) rotation of the mandrel 350 relative to a non-rotatable die plate 360 or (2) rotation of the die plate 360 relative to a non-rotatable mandrel 350. In the case of (1) (rotation of the mandrel 350 relative to a non-rotatable die plate 360, for example as shown in FIG. 6), the mandrel 350 is rotated about its longitudinal axis 360° as the mandrel 350 travels (e.g., through the crosshead assembly 372 and die plate 360) an axial distance equal to one mandrel pitch. In the case of (2) (rotation of the die plate 360 relative to a non-rotatable mandrel 350, for example as shown in FIG. 7), the die plate 360 is rotated about its longitudinal axis (an axis extending through the die outlet port and along which the mandrel 350 extends and travels as the mandrel 350 moves through the crosshead assembly 372 and die plate 360 during extrusion) 360° as the mandrel 350 travels an axial distance equal to one mandrel pitch.

Figure 8:
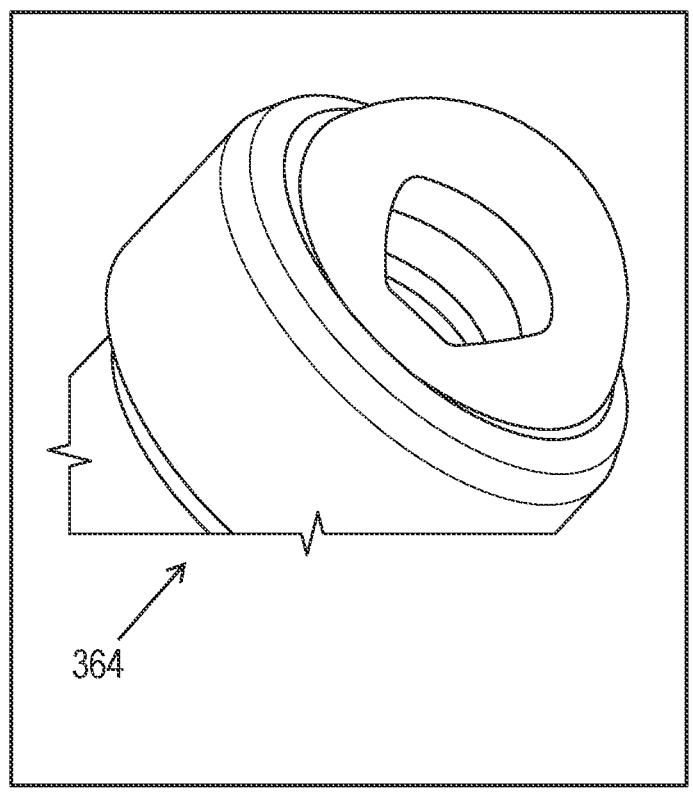
FIG. 8 shows an example ball transfer bearing.

In techniques in which the mandrel 350 rotates relative to a stationary die plate 360, for example as shown in FIG. 6, guiding pins 362 can be included and used to provide or ensure the proper kinematic match or interaction between the mandrel 350 and die plate 360. The guiding pins 362 are anchored to a stationary unit or piece of equipment, for example, to the extruder 370 or to a separate assembly mounted to a floor. In the illustrated configuration, two guiding pins 362 are included. Tips of the pins 362 are in constant contact with the mandrel's flanks during extrusion, inducing friction forces on the mandrel 350 and causing motion of the mandrel 350. If the mandrel 350 has a relatively shallow pitch, the primary load(s) applied to the mandrel 350 during extrusion should move the mandrel 350 axially through the crosshead assembly 372. In such cases, the pins 362 can cause rotational motion of the mandrel 350. If the mandrel 350 has a relatively steep pitch, the primary load(s) applied to the mandrel 350 during extrusion should rotate the mandrel 350. In such cases, the pins 362 can cause the mandrel 350 to travel axially. In some configurations, the tips of the pins 362 can be designed as ball transfer bearings 364, for example as shown in FIG. 8. In some configurations, the pins 362 can be replaced with a customized roller aligned with the mandrel's helix.

Figure 7:
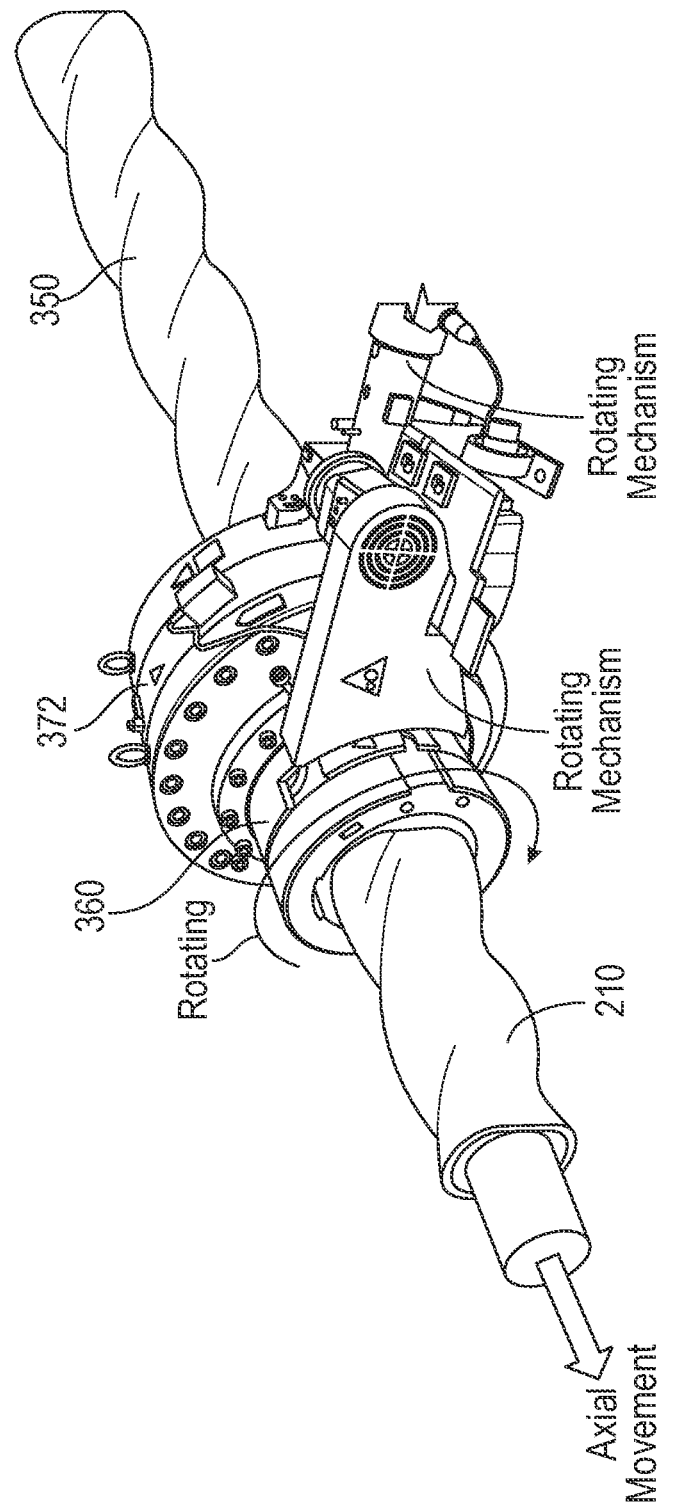
FIG. 7 shows another example technique for forming a helical rubber hose.

In techniques in which the die plate 360 rotates relative to a non-rotatable mandrel 350, for example as shown in FIG. 7, the mandrel 350 is non-rotatable and is pushed or pulled axially through the crosshead assembly 372. The die plate 360 is mounted on a rotatable die at or on an outlet or output of the crosshead assembly 372. The RPM of the die is correlated to the axial velocity of the mandrel 350 such that one revolution of the die corresponds to an axial movement of the mandrel 350 equal to one pitch.

Other variations of techniques, for example, other kinematic schemes, according to the present disclosure are also possible. For example, the mandrel 350 can be axially fixed and non-rotatable, while the die plate 360 is axially moveable and rotatable, such that the die plate 360 rotates and moves axially relative to the stationary mandrel 350. As another example, the mandrel 350 can be rotatable, but axially fixed, while the die plate 360 is axially moveable but non-rotatable, such that the mandrel 350 rotates within the die plate 360 as the die plate 360 moves axially along or relative to the axially fixed mandrel 350. As another example, both the mandrel 350 and die plate 360 can be rotatable and axially moveable.

Extrusion or manufacturing techniques according to the present disclosure can also or alternatively be used to manufacture articles other than PCP stators. For example, techniques according to the present disclosure can be used to manufacture stators for positive displacement motors (PDM), for example to be used for drilling operations. As another example, techniques according to the present disclosure can be used, or adapted to be used, to manufacture rotors (for example, PCP and/or PDM rotors). Extrusion techniques according to the present disclosure can be used to cover such rotors with rubber or plastic layers. In general, techniques according to the present disclosure can be used to manufacture helical tubes, which may be disposed within or about other components of an article.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A method of forming a hose, the method comprising:
melting an elastomer;
providing the melted elastomer to a crosshead assembly, wherein a die plate having an outlet port is mounted on an outlet of the crosshead assembly;
moving a helical mandrel relative to the crosshead assembly and the die plate outlet port while extruding the melted elastomer about the mandrel; and
kinematically correlating relative axial and rotational movement between the mandrel and the die plate, wherein the mandrel is rotationally fixed and the die plate is configured to rotate about a longitudinal axis along which the mandrel extends through the die plate, and wherein kinematically correlating the relative axial and rotational movement between the mandrel and the die plate comprises axially moving the mandrel a distance equal to one pitch of the mandrel as the die plate rotates one revolution.

2. A method of forming a hose, the method comprising:

melting an elastomer;

providing the melted elastomer to a crosshead assembly, wherein a die plate having an outlet port is mounted on an outlet of the crosshead assembly;

moving a helical mandrel relative to the crosshead assembly and the die plate outlet port while extruding the melted elastomer about the mandrel; and kinematically correlating relative axial and rotational movement between the mandrel and the die plate, wherein the die plate is rotationally fixed and the mandrel is configured to rotate about a longitudinal axis of the mandrel, and wherein kinematically correlating the relative axial and rotational movement between the mandrel and the die plate comprises rotating the mandrel about the longitudinal axis 360° as the mandrel travels axially a distance equal to one pitch of the mandrel.

3. The method of claim 1, wherein the elastomer is rubber.

4. The method of claim 1, wherein extruding the melted elastomer about the mandrel comprises extruding the melted elastomer through a gap between an outer diameter of the mandrel and an inner diameter of the die plate outlet port.

5. A method for manufacturing a stator for a progressive cavity pump or positive displacement motor, the method comprising:

forming a hose, wherein forming the hose comprises:
melting an elastomer;

providing the melted elastomer to a crosshead assembly, wherein a die plate having an outlet port is mounted on an outlet of the crosshead assembly;

moving a helical mandrel relative to the crosshead assembly and the die plate outlet port while extruding the melted elastomer about the mandrel; and kinematically correlating relative axial and rotational movement between the mandrel and the die plate, wherein kinematically correlating the relative axial and rotational movement between the mandrel and the die plate comprises causing the relative axial movement between the mandrel and the die plate a distance equal to one pitch of the mandrel while causing one revolution of the relative rotational movement between the mandrel and the die plate;

inserting the hose into a stator tube; and filling a gap between an outer diameter of the hose and an inner diameter of the stator tube with a material.

6. The method of claim 5, wherein the material is a thermoset resin or plastic.

7. The method of claim 6, further comprising curing or vulcanizing the thermoset resin or plastic to solidify and bond the material to the hose.

8. The method of claim 5, wherein the elastomer is rubber.

9. The method of claim 5, wherein forming the hose further comprises removing the mandrel from the hose.

10. The method of claim 2, wherein the elastomer is rubber.

11. The method of claim 2, wherein extruding the melted elastomer about the mandrel comprises extruding the melted elastomer through a gap between an outer diameter of the mandrel and an inner diameter of the die plate outlet port.

* * * * *